(12) United States Patent
Miwa

(10) Patent No.: US 7,987,350 B2
(45) Date of Patent: Jul. 26, 2011

(54) ELECTRONIC APPARATUS INCORPORATING A PLURALITY OF MICROPROCESSOR UNITS FOR USE IN INITIALIZING DATA

(75) Inventor: Kenji Miwa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 850 days.

(21) Appl. No.: 11/942,524

(22) Filed: Nov. 19, 2007

(65) Prior Publication Data

US 2008/0126775 A1    May 29, 2008

(30) Foreign Application Priority Data

Nov. 27, 2006   (JP) ................................. 2006-318636

(51) Int. Cl.
*G06F 9/24* (2006.01)
*G06F 15/177* (2006.01)
(52) U.S. Cl. ................. 713/1; 713/2; 713/100
(58) Field of Classification Search .................. 713/1, 2, 713/100
See application file for complete search history.

(56) References Cited

U.S. PATENT DOCUMENTS

| | | | | |
|---|---|---|---|---|
| 5,867,702 | A  * | 2/1999 | Lee | 713/1 |
| 6,336,185 | B1 * | 1/2002 | Sargenti et al. | 713/2 |
| 6,473,569 | B1 | 10/2002 | Shidate et al. | |
| 7,181,609 | B2 * | 2/2007 | Connor et al. | 713/2 |
| 2003/0117503 | A1 | 6/2003 | Miyashita | |
| 2004/0193869 | A1* | 9/2004 | Utsumi et al. | 713/2 |
| 2005/0086667 | A1* | 4/2005 | Jin et al. | 719/327 |
| 2007/0245092 | A1* | 10/2007 | Yeh | 711/147 |
| 2008/0005551 | A1* | 1/2008 | Swanson et al. | 713/2 |

FOREIGN PATENT DOCUMENTS

| | | |
|---|---|---|
| JP | 2001-94844 A | 4/2001 |
| JP | 2003-189165 A | 7/2003 |
| JP | 2005-050132 A | 2/2005 |

* cited by examiner

*Primary Examiner* — Vincent T Tran
(74) *Attorney, Agent, or Firm* — Canon U.S.A., Inc., IP Division

(57) ABSTRACT

An electronic apparatus includes an initializing unit configured to, at power-on, execute in parallel a process of initializing data, which is stored in a first nonvolatile memory and requires initialization, into a first volatile memory by a first microprocessor unit and a process of initializing data, which is stored in a second nonvolatile memory and requires initialization, into a second volatile memory by a second microprocessor unit, and to copy a second set of initialized data, which has been initialized by the second microprocessor unit and stored in the second volatile memory, into the first volatile memory via the communication interface. A startup time of the electronic apparatus is shortened.

16 Claims, 3 Drawing Sheets

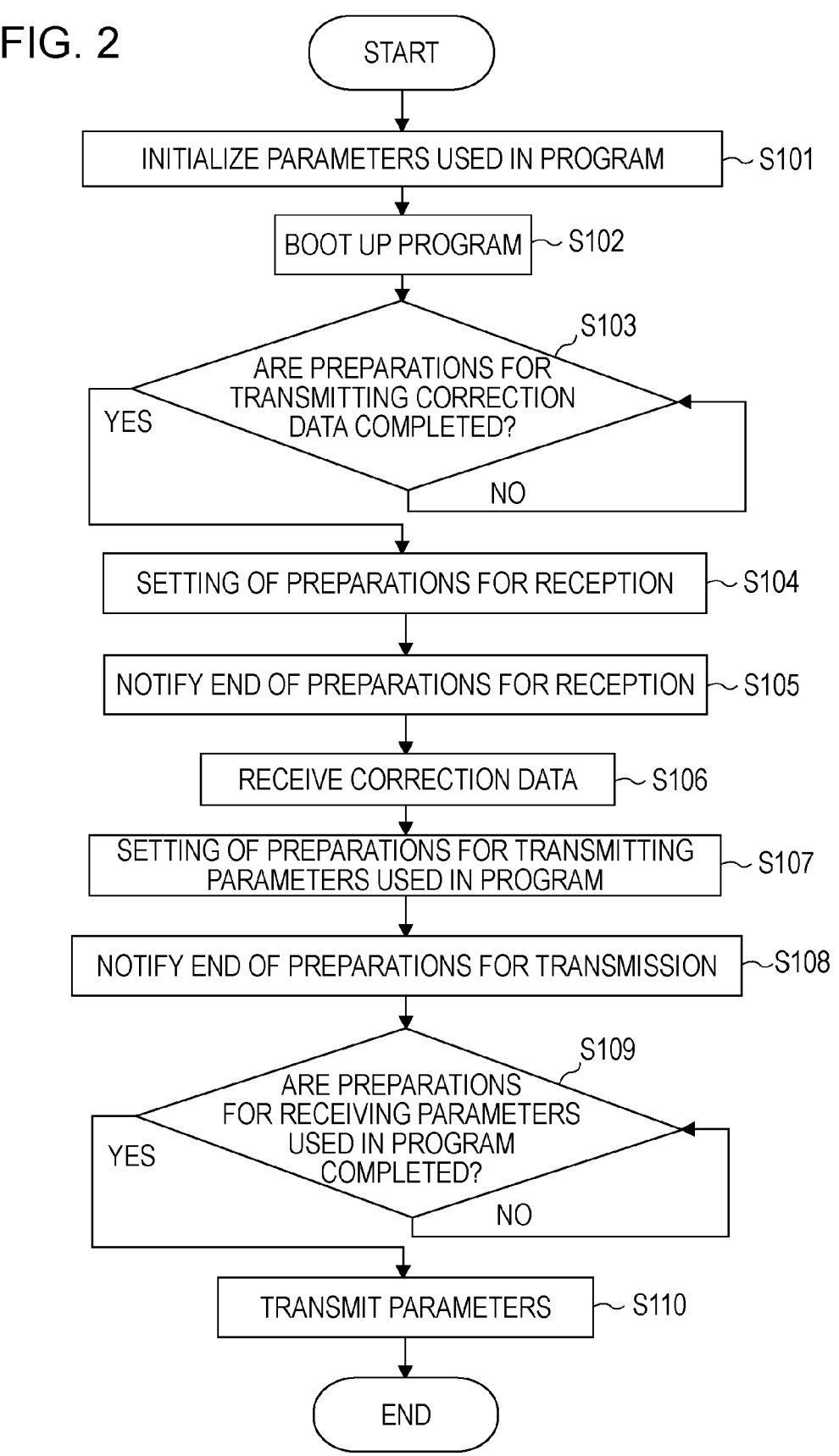

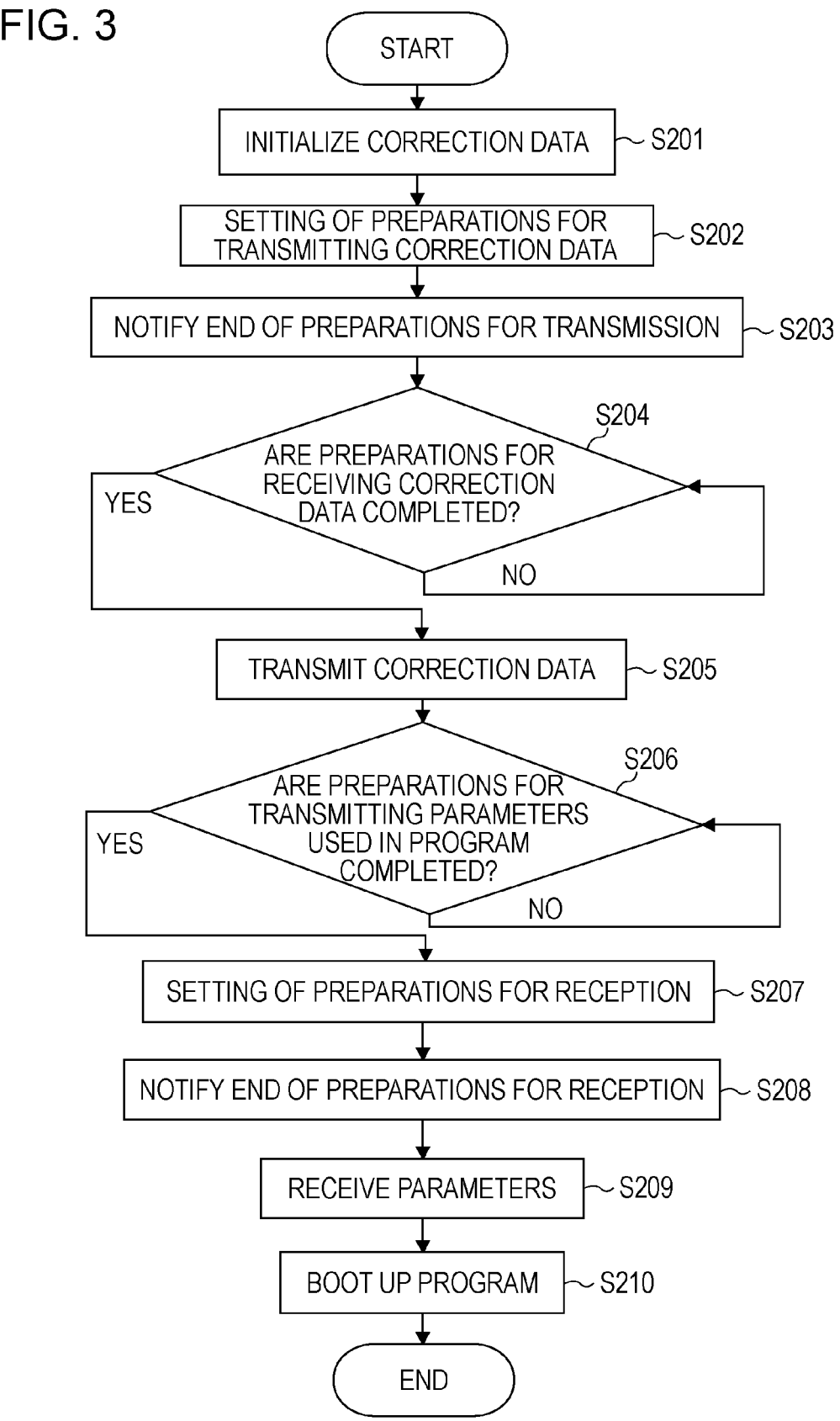

ELECTRONIC APPARATUS INCORPORATING A PLURALITY OF MICROPROCESSOR UNITS FOR USE IN INITIALIZING DATA

BACKGROUND OF THE INVENTION

1. Field of the Invention

The present invention relates to an electronic apparatus, such as an electronic camera, which incorporates a plurality of microprocessor units.

2. Description of the Related Art

An electronic camera becoming more widely used at present has a tendency to increase the number of pixels of an image pickup element employed in the electronic camera with the provision of more advanced functions. In the past, various kinds of control processes were performed by one microprocessor unit (hereinafter referred to also as "MPU (Micro Processing Unit)"). However, an electronic camera incorporating a plurality of MPUs has also been recently practiced to realize higher performance and higher functionality.

At the system startup of an electronic camera after power-on, the startup operation is performed by reading all of data, which is stored in a ROM (Read Only Memory) and requires initialization, into a RAM (Random Access Memory). At that time, a system has to be started up after the initialization of all of the data which requires the initialization. The data requiring the initialization includes, for example, not only setting values and correction values for a sensor and hardware which are necessary for picking up an image, but also setting values selected from a menu.

In the electronic camera having more advanced functions, the number of setting values which have to be set and selected is increased and the number of pixels of an image pickup element, such as a CCD (Charge-Coupled Device) or CMOS sensor, is also increased. Therefore, an amount of the data requiring the initialization tends to increase. For that reason, a difficulty arises in shortening a startup time of the camera. Hence, an image pickup operation cannot be started immediately even with pressing of a release button after the power-on, and a shutter chance is missed.

In a digital camera disclosed in Japanese Patent Laid-Open No. 2003-189165, to overcome the above-described disadvantages, a program is divided into two parts, i.e., one part required to start up an image pickup system and another part. After power-on, the program part necessary for the image pickup system is first initialized and started up. Then, the remaining part is initialized and started up. By first starting up only the program part necessary for the image pickup system, a startup time from the power-on to a photographing-enable state can be shortened to reduce a possibility that the shutter chance is missed.

Also, in a camera disclosed in Japanese Patent Laid-Open No. 2001-94844, management information necessary for reading and writing data from and in a memory card is saved/recovered respectively in response to power-off/on of the camera. This technique eliminates the need of newly reconstructing the management information for the memory card at the power-on. Accordingly, a time taken until the start of a photographing operation can be shortened to reduce a possibility that the shutter chance is missed.

In the digital camera disclosed in the above-cited Japanese Patent Laid-Open No. 2003-189165, however, the photographing operation is allowed at a point in time when the startup of the program part necessary for the image pickup system is completed. Therefore, the photographing operation is allowed in spite of a situation where there is actually an error in a memory card, or where the memory card has no vacant capacity and cannot store any more images even when the images are photographed.

The above-cited Japanese Patent Laid-Open No. 2001-94844 discloses the camera related to the technique of saving/recovering the management information necessary for the memory card, and it does not propose a method of avoiding prolongation of the system startup time, which is caused by an increase in the setting values required in the sensor and the hardware. Further, Japanese Patent Laid-Open No. 2001-94844 proposes a system incorporating a plurality of MPUs, but it has the following disadvantage. When the plurality of MPUs require the same management information, each of the MPUs has to save/recover the same management information, thus resulting in a longer startup time.

SUMMARY OF THE INVENTION

In view of the above-described problems, the present invention is directed to an electronic apparatus capable of shortening a startup time.

According to one aspect of the present invention, an electronic apparatus includes a first nonvolatile memory, a first volatile memory, a first microprocessor unit to which are connected the first nonvolatile memory and the first volatile memory, a second nonvolatile memory, a second volatile memory, a second microprocessor unit to which are connected the second nonvolatile memory and the second volatile memory, a communication interface arranged to interconnect the first microprocessor unit and the second microprocessor unit, and an initializing unit configured to, at power-on, execute in parallel a process of initializing data, which is stored in the first nonvolatile memory and requires initialization, into the first volatile memory by the first microprocessor unit and a process of initializing data, which is stored in the second nonvolatile memory and requires initialization, into the second volatile memory by the second microprocessor unit, and to copy a second set of initialized data, which has been initialized by the second microprocessor unit and stored in the second volatile memory, into the first volatile memory via the communication interface.

Further features of the present invention will become apparent from the following description of exemplary embodiments with reference to the attached drawings.

BRIEF DESCRIPTION OF THE DRAWINGS

FIG. 2 is a flowchart showing the operation at the startup of one MPU in FIG. 1.

FIG. 3 is a flowchart showing the operation at the startup of another MPU in FIG. 1.

DESCRIPTION OF THE EMBODIMENTS

Figure 1:
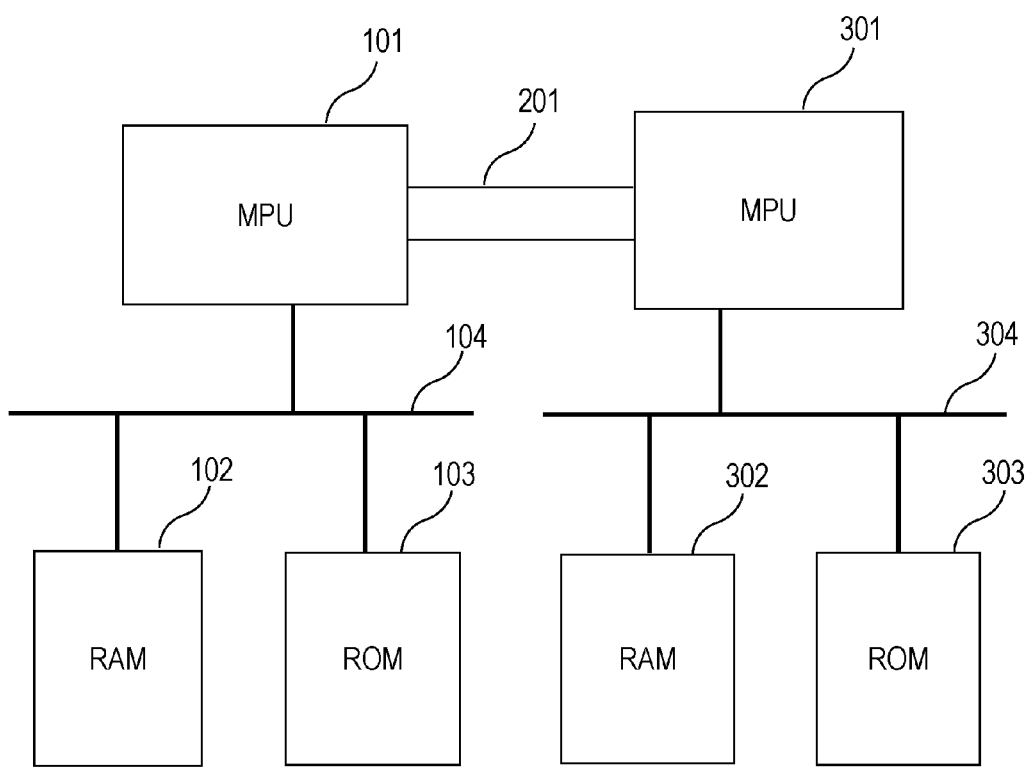
FIG. 1 is a block diagram of primary components of an electronic camera according to one exemplary embodiment of the present invention.

Embodiments of the present invention will be described in detail in accordance with the accompanying drawings.

FIG. 1 is a block diagram of main components of an electronic camera, which is one example of an electronic apparatus incorporating a plurality of MPUs, according to one exemplary embodiment of the present invention. Referring to FIG. 1, the electronic camera includes an MPU 101 incorporated therein, a RAM 102 serving as a volatile memory used by the MPU 101, and a ROM 103 serving as a nonvolatile memory used by the MPU 101. The MPU 101, the RAM 102, and the ROM 103 are interconnected by a system bus 104 on the side including the MPU 101.

The ROM 103 stores software and parameters which are required to operate the camera. The parameters include ones which are common in the same model, and other ones which are specific to each model and differ per camera (i.e., depending on individual settings). Also, the parameters include ones which are just read and are not rewritten, and other ones which are read and rewritten.

Generally, a nonvolatile ROM has a slower read rate than a RAM. Therefore, when it is required to read a parameter at a high rate, even a parameter that is just read is often used after being developed into a RAM from a ROM.

The electronic camera further includes an MPU 301 incorporated therein, a RAM 302 serving a volatile memory used by the MPU 301, and a ROM 303 serving as a nonvolatile memory used by the MPU 301. The MPU 301, the RAM 302, and the ROM 303 are interconnected by a system bus 304 on the side including the MPU 301.

The MPU 101 and the MPU 301 are connected to each other by a high-rate bus 201, i.e., a high-rate communication interface dedicated for interconnection between MPUs, such that information is notified via the inter-MPU high-rate bus 201. The inter-MPU high-rate bus 201 is a dedicated bus having a data transfer rate comparable to that of the RAM which is connected to each of the MPU 101 and the MPU 301. When data is transferred, the type and the transfer size of the data are first notified from the MPU as a transfer source to the MPU as a transfer destination. Then, the transfer destination MPU performs preparations for receiving the data and notifies the end of the preparations for the reception to the transfer source MPU. Finally, the transfer source MPU starts transmission of the data. In such a way, the data can be transferred between the MPUs via the bus.

Parameters necessary for executing a program and parameters (correction data) necessary for correcting an image in an image pickup operation are separately stored in the ROM 103 and the ROM 303. The parameters necessary for executing the program are parameters that are required to start up the program and are further required earlier than the operation of the electronic camera. On the other hand, the parameters necessary for the image correction are parameters that are required to be initialized until reaching a time when the image pickup operation is actually performed after the startup of the electronic camera. The reason why the parameters are divided into ones necessary for executing the program and the others (correction data) necessary for the image correction resides in enabling the MPU 101 and the MPU 301 to initialize the divided groups of parameters in parallel at the startup by storing the divided groups of parameters to be initialized, which are required at different points in time, in two respective ROMs.

The operation of the thus-constructed electronic camera at the startup will be described next. FIG. 2 is a flowchart showing the operation at the startup of the MPU 101, and FIG. 3 is a flowchart showing the operation at the startup of the MPU 301.

When the startup is instructed by turning-on a power switch, the MPU 101 and the MPU 301 are both released from the reset state at the same time to start up a system of the electronic camera. The operations at the startup of the MPU 101 and the MPU 301 will be described in detail with reference to the flowcharts of FIGS. 2 and 3.

The MPU 101 first develops the parameters necessary for executing the program into the RAM 102 from the ROM 103 (S101). Then, after the completion of development of the parameters, the MPU 101 executes a program booting process (S102).

The MPU 301 first develops the correction data necessary for correcting the image into the RAM 302 from the ROM 303 (S201). Then, after the completion of development of the correction data, the MPU 301 executes correction-data transmission setting for the inter-MPU high-rate bus 201 (S202) and notifies the end of the preparations for transmitting the correction data to the MPU 101 (S203).

Upon receiving, from the MPU 301, a notice indicating the end of the preparations for transmitting the correction data (S103), the MPU 101 performs the setting needed to receive the correction data for the inter-MPU high-rate bus 201 (S104) and notifies the end of the preparations for receiving the correction data to the MPU 301 (S105). After receiving a notice indicating the end of the preparations for the reception (S204), the MPU 301 transfers the correction data (S205) such that the MPU 101 can develop the correction data, which has been developed in the RAM 302, into the RAM 102 via the inter-MPU high-rate bus 201 (S106). Upon the completion of development of the correction data, the parameters requiring the development are all developed in the RAM 102. At this time, the electronic camera comes into a state where the MPU 101 can start the operation of the electronic camera, such as image pickup or reproduction. After receiving the correction data and developing the parameters, the MPU 101 performs the setting needed to transmit the parameters via the inter-MPU high-rate bus 201 (S107) and notifies the end of the preparations for the transmission to the MPU 301 (S108).

After receiving a notice indicating the end of preparations for transmission (S206), the MPU 301 develops the parameters necessary for executing the program, which have been developed in the RAM 102 and sent to the RAM 302 via the inter-MPU high-rate bus 201. More specifically, the MPU 301 performs the setting needed to receive the parameters for the inter-MPU high-rate bus 201 (S207) and notifies the end of the preparations for the reception to the MPU 101 (S208). After receiving a notice indicating the end of the preparations for the reception (S109), the MPU 101 starts transfer of the parameters (S110) such that the MPU 301 can develop the parameters necessary for executing the program into the RAM 302 (S209). Upon the completion of development of the parameters, the MPU 301 is allowed to transit to a program booting process and executes the program booting process (S210). Hence, the electronic camera comes into a state where the MPU 301 can start the operation of the electronic camera, such as image pickup or reproduction.

Because the electronic camera system comes into a started-up state at the time when the boot-up of the program and the initialization of the parameters are completed on the side including the MPU 101, there is no problem even when the startup process is completed in the MPU 301 with a delay from the MPU 101. In that case, the MPU 101 operates as a primary MPU in the electronic camera system.

In the above-described exemplary embodiment, the setting for the inter-MPU high-rate bus 201 by the transfer destination MPU is performed after receiving the notice indicating the end of the preparations for the transmission in the transfer source MPU. However, since the development sequence and the development size of the parameters are known in advance in many cases, the setting for the reception can be set for the inter-MPU high-rate bus 201 before the notice indicating the end of the preparations for the transmission is received from the transfer source MPU. In such a case, a time required from the setting of the data transfer to the actual transfer using the inter-MPU high-rate bus 201 can be shortened by notifying the end of the preparations for the reception immediately upon receiving the notice indicating the end of the preparations for the transmission.

Also, the data transfer via the inter-MPU high-rate bus 201 can be performed through hardware using DMA (Direct Memory Access), for example, so as to reduce the amount of processing to be executed by the MPU.

Further, the data transfer via the inter-MPU high-rate bus 201 can be performed by such an arrangement that the transfer source MPU is able to directly access a memory in the transfer destination MPU to copy the parameters in the memory without the process of mutually confirming the communication partners, i.e., the transfer source MPU and the transfer destination MPU.

As described above, when developing the parameters necessary for performing the operation of the electronic camera, the MPU 101 is just required to read the parameters necessary for executing the program from the ROM having a relatively low read rate, and the parameters necessary for the image correction are developed by using the inter-MPU high-rate bus 201. Accordingly, the startup time can be shortened. In addition, since the developments of the parameters from the ROMs are performed by the MPU 101 and the MPU 301 in parallel, quicker startup of the electronic camera can be realized.

The electronic camera according to the above-described exemplary embodiment incorporates the plurality MPUs each having the ROM and the RAM and also includes the inter-MPU high-rate bus 201 connecting the MPUs to each other. At power-on of the electronic camera, the data stored in the ROMs and requiring initialization is developed into the RAMs for the initialization by the plural MPUs at the same time. Then, respective sets of the initialized data are copied between the MPUs from one to the other and vice versa via the inter-MPU high-rate bus 201.

As a result, in the electronic camera incorporating the plural MPUs to realize higher performance and higher functionality, the startup time can be shortened as far as possible even with the presence of a large amount data requiring the initialization, thus reducing a possibility that the shutter chance is missed.

Also, the data to be initialized at the power-on is initialized by the plural MPUs in a manner not overlapping with each other. With that feature, the initialization process can be performed without overlapping and the time required for the initialization can be minimized.

Further, the data to be initialized at the power-on is divided into data that is necessary in the first half of the initialization process of the electronic camera and data that is necessary in the second half of the initialization process of the electronic camera. Correspondingly, MPUs are separated into at least one MPU for initializing the data necessary in the first half of the initialization process of the electronic camera and at least one MPU for initializing the data necessary in the second half of the initialization process of the electronic camera. With that feature, when the initialization of the data necessary in the first half of the initialization process of the electronic camera is completed, a subsequent initialization process can be immediately started at earlier timing. The data necessary in the second half of the initialization process of the electronic camera is copied between the MPUs after the initialization of the data necessary in the first half of the initialization process. Hence, all of the data can be initialized while realizing a shorter initialization time of the electronic camera.

Moreover, the data to be initialized at the power-on is divided so as to have the same data size. Therefore, the time required for each MPU to execute the initialization is the same, thus minimizing the time taken until one MPU starts copying of the data from the other MPU after each MPU has completed the initialization of the respective data. In other words, the initialization time of the electronic camera can be prevented from being prolonged due to the reason that one MPU has to wait for the completion of the initialization executed by the other MPU.

Alternatively, the data to be initialized at the power-on is divided so as to have the same initialization time. With that feature, even when the initialization time differs depending on the difference in the contents of the initialization process in spite of the divided sets of data having the same size, the MPUs can complete the respective initialization processes at the same timing as a result of dividing the data in consideration of the initialization time. After the completion of the initialization process executed by one MPU, the copying of the data from the other MPU to the one MPU can be started immediately and the initialization time of the electronic camera can be shortened.

In addition, a primary one of the plural MPUs is set to initialize the data necessary in the first half of the initialization process of the electronic camera. Since the primary MPU initializes the data necessary in the first half of the initialization process, the primary MPU can execute the entire initialization process with higher priority than the other MPU. After the primary MPU has completed the entire initialization process, the other MPU executes the remaining initialization process. Hence, the initialization time required to start up the electronic camera by the primary MPU can be shortened.

With the features described above, an electronic camera is realized which has a shorter startup time and can reduce a possibility that the shutter chance is missed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2006-318636 filed Nov. 27, 2006, which is hereby incorporated by reference herein in its entirety.

What is claimed is:

1. An electronic apparatus including:
a first nonvolatile memory;
a first volatile memory;
a first microprocessor unit to which are connected the first nonvolatile memory and the first volatile memory;
a second nonvolatile memory;
a second volatile memory;
a second microprocessor unit to which are connected the second nonvolatile memory and the second volatile memory;
a communication interface arranged to interconnect the first microprocessor unit and the second microprocessor unit; and
an initializing unit configured to, at power-on,
execute in parallel a process of initializing data, which is stored in the first nonvolatile memory and requires initialization, into the first volatile memory by the first microprocessor unit, and a process of initializing data, which is stored in the second nonvolatile memory and requires initialization, into the second volatile memory by the second microprocessor unit;
copy a second set of initialized data, which has been initialized by the second microprocessor unit and stored in the second volatile memory, into the first volatile memory via the communication interface; and copy a first set of initialized data, which has been initialized by the first microprocessor unit and stored in the first volatile memory, into the second volatile memory via the communication interface.

2. The electronic apparatus according to Claim 1, wherein the initializing unit executes the initialization such that the initialized data and the second set of initialized data are not overlapped with each other.

3. The electronic apparatus according to Claim 1, wherein the first volatile memory connected to the first microprocessor unit receives a copy of the initialized data before the other data.

4. An electronic apparatus including:
a first nonvolatile memory;
a first volatile memory;
a first microprocessor unit to which are connected the first nonvolatile memory and the first volatile memory;
a second nonvolatile memory;
a second volatile memory;
a second microprocessor unit to which are connected the second nonvolatile memory and the second volatile memory;
a communication interface arranged to interconnect the first microprocessor unit and the second microprocessor unit; and
an initializing unit configured to, at power-on,
    execute in parallel a process of initializing data, which is stored in the first nonvolatile memory and requires initialization, into the first volatile memory by the first microprocessor unit, and a process of initializing data, which is stored in the second nonvolatile memory and requires initialization, into the second volatile memory by the second microprocessor unit; and
    copy a second set of initialized data, which has been initialized by the second microprocessor unit and stored in the second volatile memory, into the first volatile memory via the communication interface,
wherein the data stored in the first nonvolatile memory and requiring initialization and the data stored in the second nonvolatile memory and requiring initialization are each given by one of divided parts of data, which are successively required in accordance with the progress of an entire initialization process, and the initializing unit copies the initialized data at a time when a process of initializing each of the divided parts of the data is completed.

5. An electronic apparatus including:
a first nonvolatile memory;
a first volatile memory;
a first microprocessor unit to which are connected the first nonvolatile memory and the first volatile memory;
a second nonvolatile memory;
a second volatile memory;
a second microprocessor unit to which are connected the second nonvolatile memory and the second volatile memory;
a communication interface arranged to interconnect the first microprocessor unit and the second microprocessor unit; and
an initializing unit configured to, at power-on,
    execute in parallel a process of initializing data, which is stored in the first nonvolatile memory and requires initialization, into the first volatile memory by the first microprocessor unit, and a process of initializing data, which is stored in the second nonvolatile memory and requires initialization, into the second volatile memory by the second microprocessor unit; and
    copy a second set of initialized data, which has been initialized by the second microprocessor unit and stored in the second volatile memory, into the first volatile memory via the communication interface,
wherein the data stored in the first nonvolatile memory and requiring initialization and the data stored in the second nonvolatile memory and requiring initialization are each given by one of divided parts of data, wherein the divided parts of the data are divided to have the same data size.

6. An electronic apparatus including:
a first nonvolatile memory;
a first volatile memory;
a first microprocessor unit to which are connected the first nonvolatile memory and the first volatile memory;
a second nonvolatile memory;
a second volatile memory;
a second microprocessor unit to which are connected the second nonvolatile memory and the second volatile memory;
a communication interface arranged to interconnect the first microprocessor unit and the second microprocessor unit; and
an initializing unit configured to, at power-on,
    execute in parallel a process of initializing data, which is stored in the first nonvolatile memory and requires initialization, into the first volatile memory by the first microprocessor unit, and a process of initializing data, which is stored in the second nonvolatile memory and requires initialization, into the second volatile memory by the second microprocessor unit; and
    copy a second set of initialized data, which has been initialized by the second microprocessor unit and stored in the second volatile memory, into the first volatile memory via the communication interface,
wherein the data stored in the first nonvolatile memory and requiring initialization and the data stored in the second nonvolatile memory and requiring initialization are each given by one of divided parts of data, wherein the divided parts of the data are divided to have the same processing time.

7. A control method for an electronic apparatus including:
a first nonvolatile memory;
a first volatile memory;
a first microprocessor unit to which are connected the first nonvolatile memory and the first volatile memory;
a second nonvolatile memory;
a second volatile memory;
a second microprocessor unit to which are connected the second nonvolatile memory and the second volatile memory; and
a communication interface arranged to interconnect the first microprocessor unit and the second microprocessor unit, the control method comprising:
a first processing step of, at power-on, initializing data, which is stored in the first nonvolatile memory and requires initialization, into the first volatile memory by the first microprocessor unit;
a second processing step of, at power-on, initializing data, which is stored in the second nonvolatile memory and requires initialization, into the second volatile memory by the second microprocessor unit;
a step of copying a second set of initialized data, which has been initialized by the second microprocessor unit and stored in the second volatile memory, into the first volatile memory via the communication interface; and a step of copying a first set of initialized data, which has been initialized by the first microprocessor unit and stored in the first volatile memory, into the second volatile memory via the communication interface, wherein the first processing step and the second processing are executed in parallel.

8. An electronic apparatus including:

a first nonvolatile memory;

a first volatile memory;

a first microprocessor unit to which are connected the first nonvolatile memory and the first volatile memory;

a second nonvolatile memory;

a second volatile memory;

a second microprocessor unit to which are connected the second nonvolatile memory and the second volatile memory;

a communication interface arranged to interconnect the first microprocessor unit and the second microprocessor unit; and a switch for starting up the electronic apparatus, wherein when the electronic apparatus is started up by the switch, the first microprocessor unit initializes first data to be initialized stored in the first nonvolatile memory into the first volatile memory, wherein when the electronic apparatus is started up by the switch, the second microprocessor unit initializes second data to be initialized stored in the second nonvolatile memory into the second volatile memory, wherein the initialization operation by the first microprocessor unit and the initialization operation by the second microprocessor unit are executed in parallel, wherein after the initialization operation by the second microprocessor unit is completed, data obtained by initializing the second data to be initialized into the second volatile memory is transferred to the first volatile memory via the communication interface, and wherein after the data obtained by initializing the second data to be initialized into the second volatile memory is transferred to the first volatile memory via the communication interface, data obtained by initializing the first data to be initialized into the first volatile memory is transferred to the second volatile memory via the communication interface.

9. The electronic apparatus according to claim 8, wherein data size of the first data to be initialized and data size of the second data to be initialized are set such that time for initializing the first data to be initialized into the first volatile memory by the first microprocessor unit is equal to time for initializing the second data to be initialized into the second volatile memory by the second microprocessor unit.

10. The electronic apparatus according to claim 8, wherein the data size of the first data to be initialized is equal to the data size of the second data to be initialized.

11. The electronic apparatus according to claim 8, wherein the first data to be initialized is necessary in the first half of an initialization process of the electronic apparatus, the second data to be initialized is necessary in the second half of the initialization process of the electronic apparatus.

12. The electronic apparatus according to claim 8, wherein the first data to be initialized is parameters necessary for executing the program and the second data to be initialized is correction data necessary for correcting the image.

13. An electronic apparatus including:

a first nonvolatile memory;

a first volatile memory;

a first microprocessor unit to which are connected the first nonvolatile memory and the first volatile memory;

a second nonvolatile memory;

a second volatile memory;

a second microprocessor unit to which are connected the second nonvolatile memory and the second volatile memory;

a communication interface arranged to interconnect the first microprocessor unit and the second microprocessor unit; and a switch for starting up the electronic apparatus, wherein when the electronic apparatus is started up by the switch, the first microprocessor unit initializes first data to be initialized stored in the first nonvolatile memory into the first volatile memory, wherein when the electronic apparatus is started up by the switch, the second microprocessor unit initializes second data to be initialized stored in the second nonvolatile memory into the second volatile memory, wherein the initialization operation by the first microprocessor unit and the initialization operation by the second microprocessor unit are executed in parallel, wherein after the initialization operation by the second microprocessor unit is completed, data obtained by initializing the second data to be initialized into the second volatile memory is transferred to the first volatile memory via the communication interface, and wherein data size of the first data to be initialized and data size of the second data to be initialized are set such that time for initializing the first data to be initialized into the first volatile memory by the first microprocessor unit is equal to time for initializing the second data to be initialized into the second volatile memory by the second microprocessor unit.

14. An electronic apparatus including:

a first nonvolatile memory;

a first volatile memory;

a first microprocessor unit to which are connected the first nonvolatile memory and the first volatile memory;

a second nonvolatile memory;

a second volatile memory;

a second microprocessor unit to which are connected the second nonvolatile memory and the second volatile memory;

a communication interface arranged to interconnect the first microprocessor unit and the second microprocessor unit; and a switch for starting up the electronic apparatus, wherein when the electronic apparatus is started up by the switch, the first microprocessor unit initializes first data to be initialized stored in the first nonvolatile memory into the first volatile memory, wherein when the electronic apparatus is started up by the switch, the second microprocessor unit initializes second data to be initialized stored in the second nonvolatile memory into the second volatile memory, wherein the initialization operation by the first microprocessor unit and the initialization operation by the second microprocessor unit are executed in parallel, wherein after the initialization operation by the second microprocessor unit is completed, data obtained by initializing the second data to be initialized into the second volatile memory is transferred to the first volatile memory via the communication interface, and wherein the data size of the first data to be initialized is equal to the data size of the second data to be initialized.

15. An electronic apparatus including:
a first nonvolatile memory;
a first volatile memory;
a first microprocessor unit to which are connected the first nonvolatile memory and the first volatile memory;
a second nonvolatile memory;
a second volatile memory;
a second microprocessor unit to which are connected the second nonvolatile memory and the second volatile memory;
a communication interface arranged to interconnect the first microprocessor unit and the second microprocessor unit; and
a switch for starting up the electronic apparatus,
wherein when the electronic apparatus is started up by the switch, the first microprocessor unit initializes first data to be initialized stored in the first nonvolatile memory into the first volatile memory,
wherein when the electronic apparatus is started up by the switch, the second microprocessor unit initializes second data to be initialized stored in the second nonvolatile memory into the second volatile memory,
wherein the initialization operation by the first microprocessor unit and the initialization operation by the second microprocessor unit are executed in parallel,
wherein after the initialization operation by the second microprocessor unit is completed, data obtained by initializing the second data to be initialized into the second volatile memory is transferred to the first volatile memory via the communication interface, and
wherein the first data to be initialized is necessary in the first half of an initialization process of the electronic apparatus, the second data to be initialized is necessary in the second half of the initialization process of the electronic apparatus.

16. An electronic apparatus including:
a first nonvolatile memory;
a first volatile memory;
a first microprocessor unit to which are connected the first nonvolatile memory and the first volatile memory;
a second nonvolatile memory;
a second volatile memory;
a second microprocessor unit to which are connected the second nonvolatile memory and the second volatile memory;
a communication interface arranged to interconnect the first microprocessor unit and the second microprocessor unit; and
a switch for starting up the electronic apparatus,
wherein when the electronic apparatus is started up by the switch, the first microprocessor unit initializes first data to be initialized stored in the first nonvolatile memory into the first volatile memory,
wherein when the electronic apparatus is started up by the switch, the second microprocessor unit initializes second data to be initialized stored in the second nonvolatile memory into the second volatile memory,
wherein the initialization operation by the first microprocessor unit and the initialization operation by the second microprocessor unit are executed in parallel,
wherein after the initialization operation by the second microprocessor unit is completed, data obtained by initializing the second data to be initialized into the second volatile memory is transferred to the first volatile memory via the communication interface, and
wherein the first data to be initialized is parameters necessary for executing the program and the second data to be initialized is correction data necessary for correcting the image.

* * * * *